(12) United States Patent  
Tatsuoka et al.

(10) Patent No.: US 7,908,592 B2
(45) Date of Patent: Mar. 15, 2011

(54) SOFTWARE/HARDWARE PARTITIONING PROGRAM AND METHOD

(75) Inventors: Masato Tatsuoka, Kawasaki (JP); Atsushi Ike, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1139 days.

(21) Appl. No.: 11/538,601

(22) Filed: Oct. 4, 2006

(65) Prior Publication Data

US 2007/0245326 A1  Oct. 18, 2007

(30) Foreign Application Priority Data

Apr. 12, 2006  (JP) .................................. 2006-109848

(51) Int. Cl.
*G06F 9/44* (2006.01)
*G06F 9/45* (2006.01)

(52) U.S. Cl. ............................... 717/131; 703/22; 716/7
(58) Field of Classification Search .................. 717/140, 717/131; 716/2, 3, 7; 703/2
See application file for complete search history.

(56) References Cited

U.S. PATENT DOCUMENTS

| | | | | |
|---|---|---|---|---|
| 5,805,792 A * | 9/1998 | Swoboda et al. | ................ | 714/28 |
| 5,966,534 A * | 10/1999 | Cooke et al. | ................. | 717/155 |
| 6,634,017 B2 | 10/2003 | Matsui et al. | | |
| 6,871,341 B1 * | 3/2005 | Shyr | ............................. | 717/131 |
| 7,007,270 B2 | 2/2006 | Martin et al. | | |
| 7,278,122 B2 * | 10/2007 | Willis | ............................... | 716/3 |
| 7,509,629 B2 * | 3/2009 | Sakamoto et al. | ............ | 717/105 |
| 7,765,547 B2 * | 7/2010 | Cismas et al. | ................ | 718/100 |
| 2002/0052726 A1 * | 5/2002 | Tajima et al. | .................... | 703/22 |
| 2002/0072893 A1 * | 6/2002 | Wilson | ............................ | 703/26 |
| 2002/0100029 A1 * | 7/2002 | Bowen | .......................... | 717/140 |
| 2002/0152061 A1 | 10/2002 | Shimogori et al. | | |
| 2003/0014611 A1 * | 1/2003 | Ferris | ............................... | 712/35 |
| 2003/0120460 A1 * | 6/2003 | Aubury | ......................... | 702/182 |
| 2006/0041872 A1 * | 2/2006 | Poznanovic et al. | ........... | 717/140 |
| 2007/0028244 A1 * | 2/2007 | Landis et al. | ................. | 718/108 |

FOREIGN PATENT DOCUMENTS

| | | |
|---|---|---|
| JP | 11-259552 | 9/1999 |
| JP | 2002-230065 A | 8/2002 |
| JP | 2003-216678 A | 7/2003 |
| JP | 2004-530193 | 9/2004 |
| JP | 2005-44129 A | 2/2005 |
| JP | 2005-182359 A | 7/2005 |
| JP | 2005-332110 | 12/2005 |

OTHER PUBLICATIONS

S. Takaki et al., "Hardware/Software Partitioning Methodology for Systems on Chip (SoCs) with RISC Host and Configurable Microprocessors," IP Based SoC Design 2003, pp. 1-10. http://www.design-reuse.com/articles/6978/hardware-software-partitioning-methodology-for-systems-on-chip-socs-with-risc-host-and-configurable-microprocessors.html.*

* cited by examiner

*Primary Examiner* — Wei Y Zhen
*Assistant Examiner* — Chih-Ching Chow
(74) *Attorney, Agent, or Firm* — Fujitsu Patent Center

(57) ABSTRACT

A software/hardware (SW/HW) partitioning and evaluating program allows a computer to perform a procedure of compiling a source code in which a mark is added to a portion to be executed by hardware, a procedure of generating an executable program for a simulator of CPU on a system-on-chip (SoC), a procedure of storing in memory an execution result of the executable program, and a procedure of evaluating an SW/HW partition based on the execution result.

6 Claims, 18 Drawing Sheets

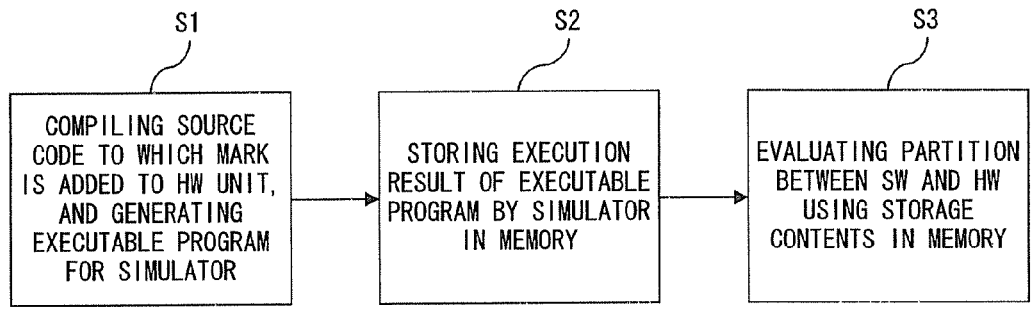
F I G. 1 A
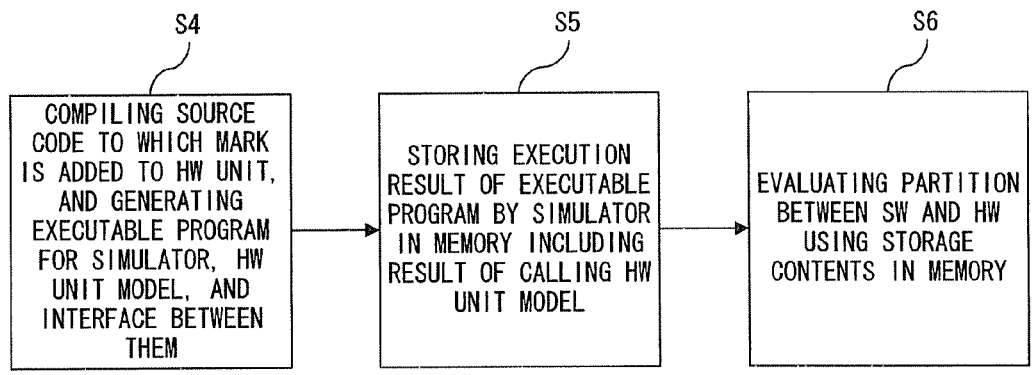
F I G. 1 B

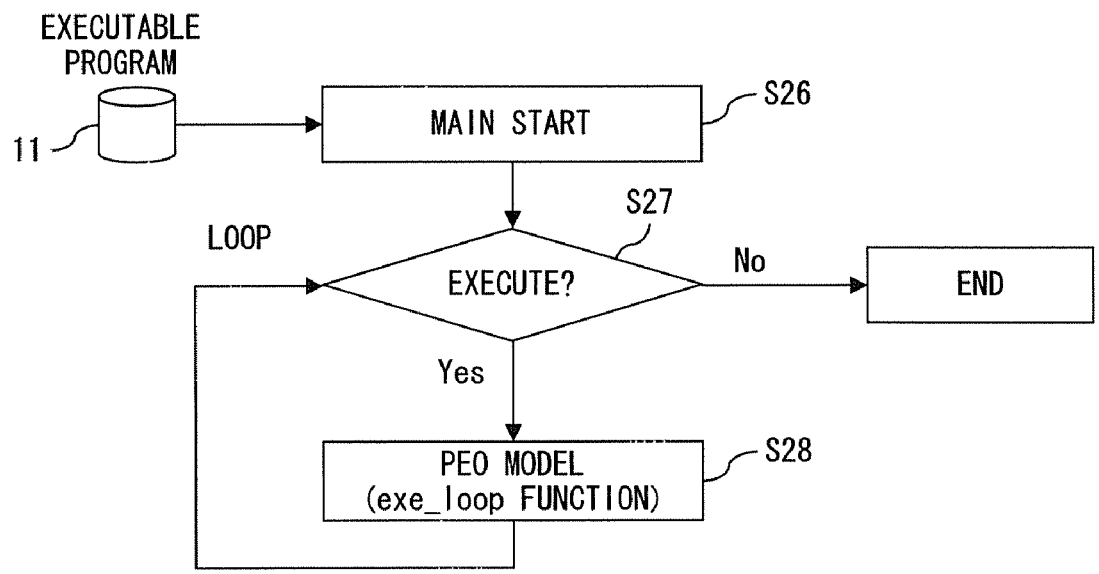
F I G. 4

1. TYPE OF EXECUTION INSTRUCTION
2. NUMBER OF INSTURCTIONS (INCLUDING ARITHMETIC COMPLEXITY)
3. NUMBER OF CYCLES
4. COMMUNICATION FREQUENCY AND AMOUNT OF COMMUNICATION DATA BETWEEN PROCESSORS, ETC.
5. AMOUNT OF DATA ACCESS BY LOAD STORE
6. EXTRACTING PARALLELISM OF PROGRAMS (CONFIRMING DATA DEPENDENCY)
7. OTHERS

F I G. 6

SOURCE CODE 16

```
C CODE
   :
#pragma  USER_HW
   :
   C CODE
   :
#end USER_HW
   :
C CODE
   :
```

F I G. 7

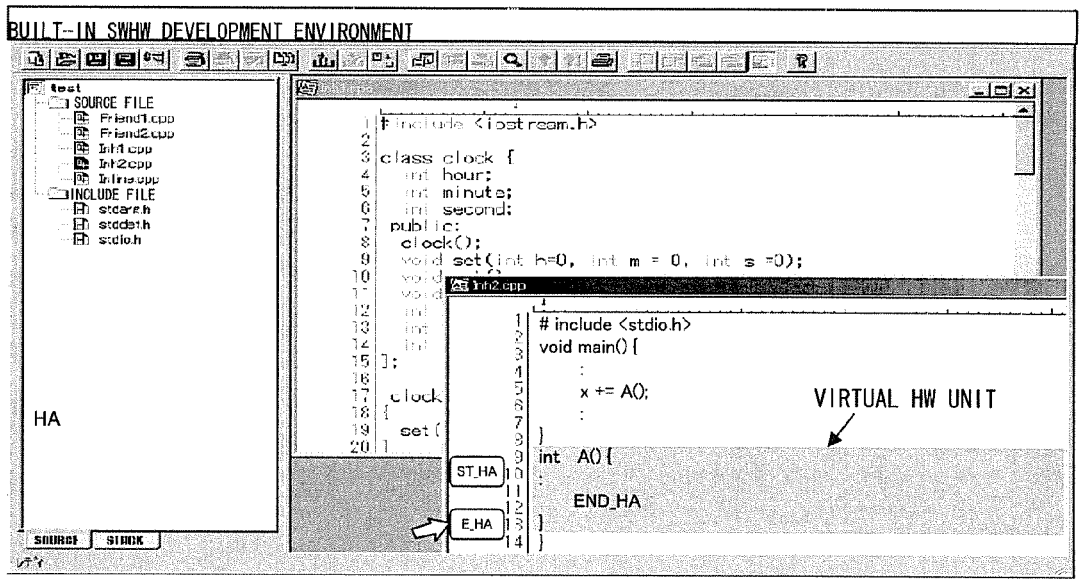
F I G. 9

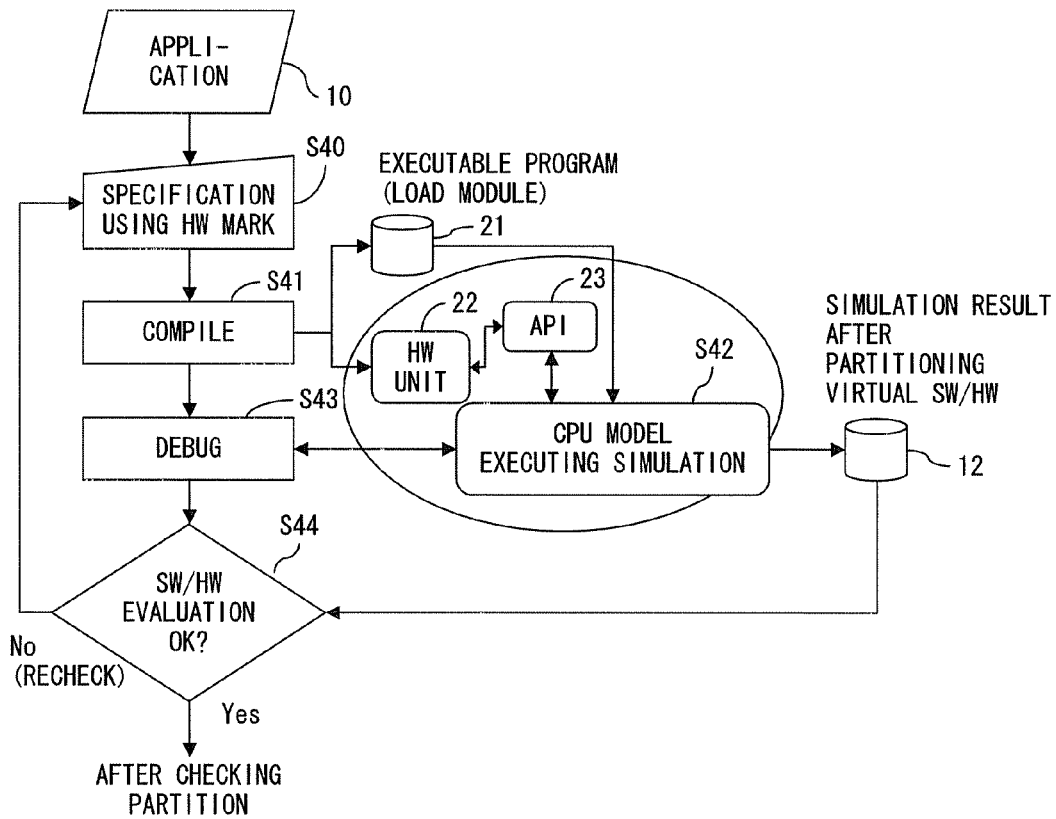
F I G. 10

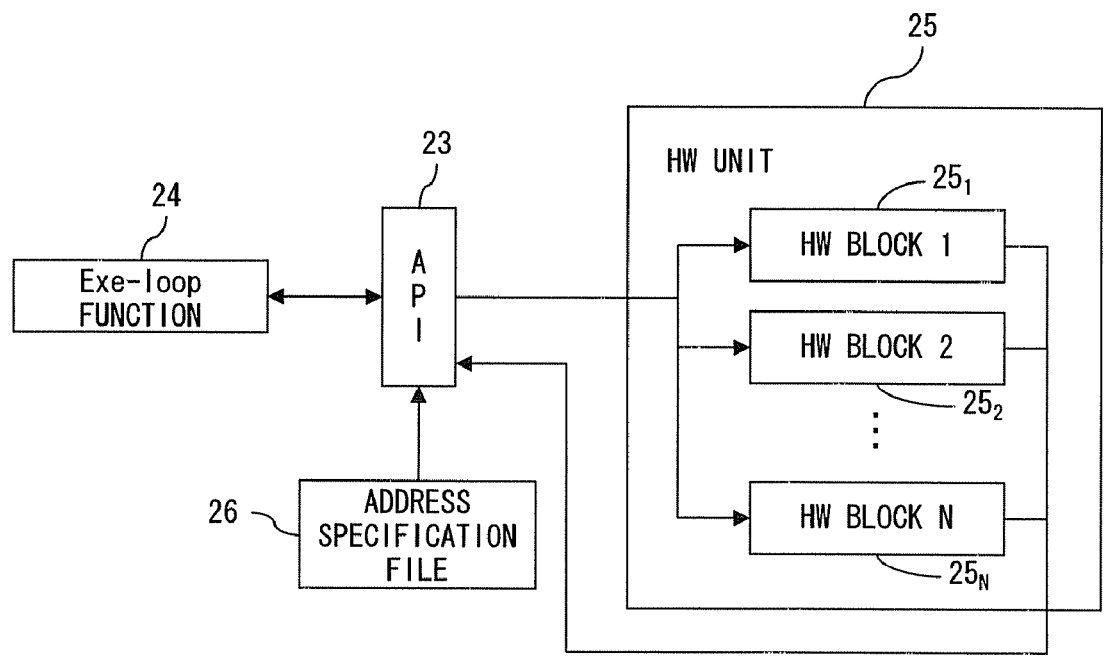
F I G. 1 1

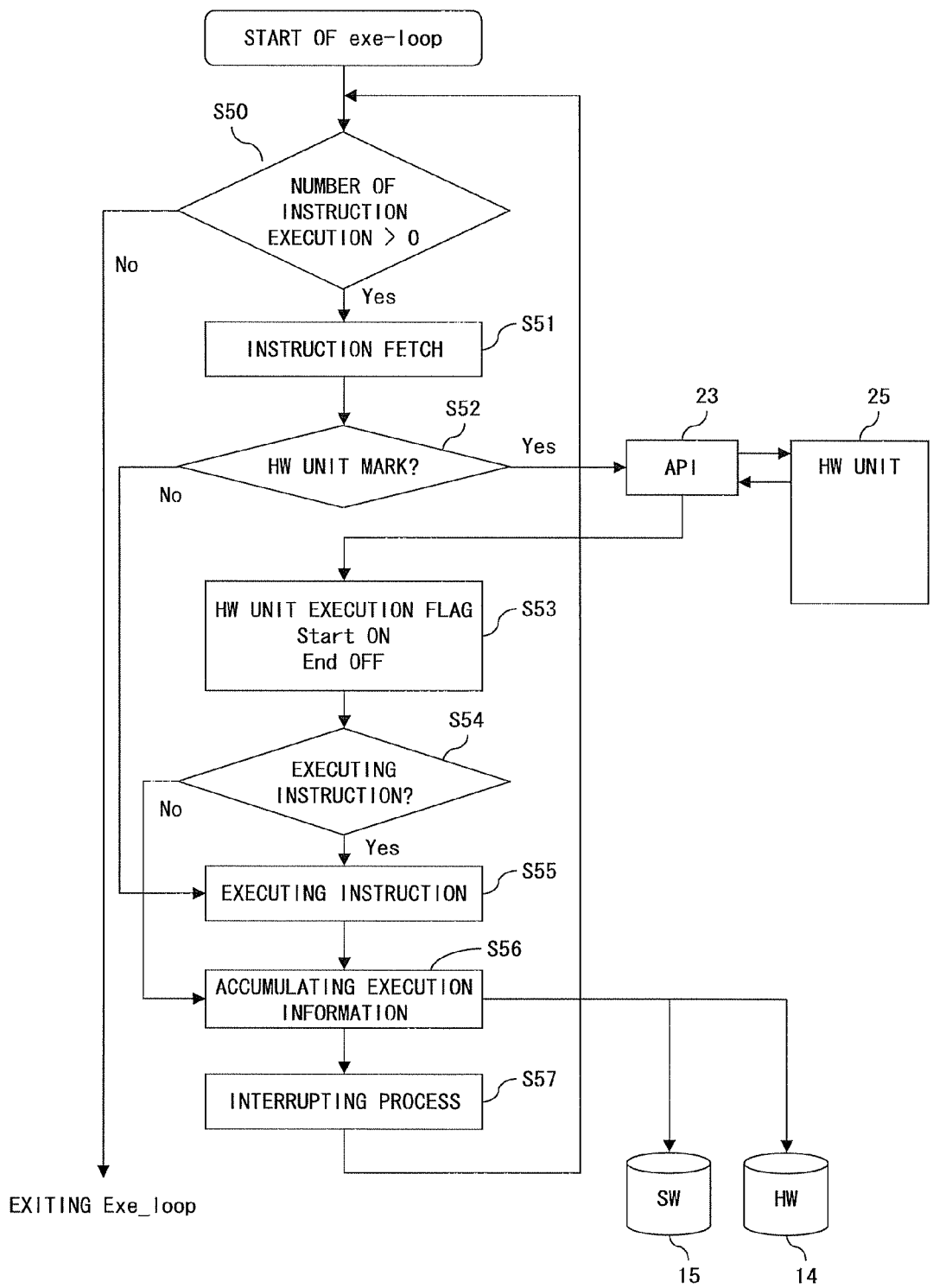
F I G. 1 2

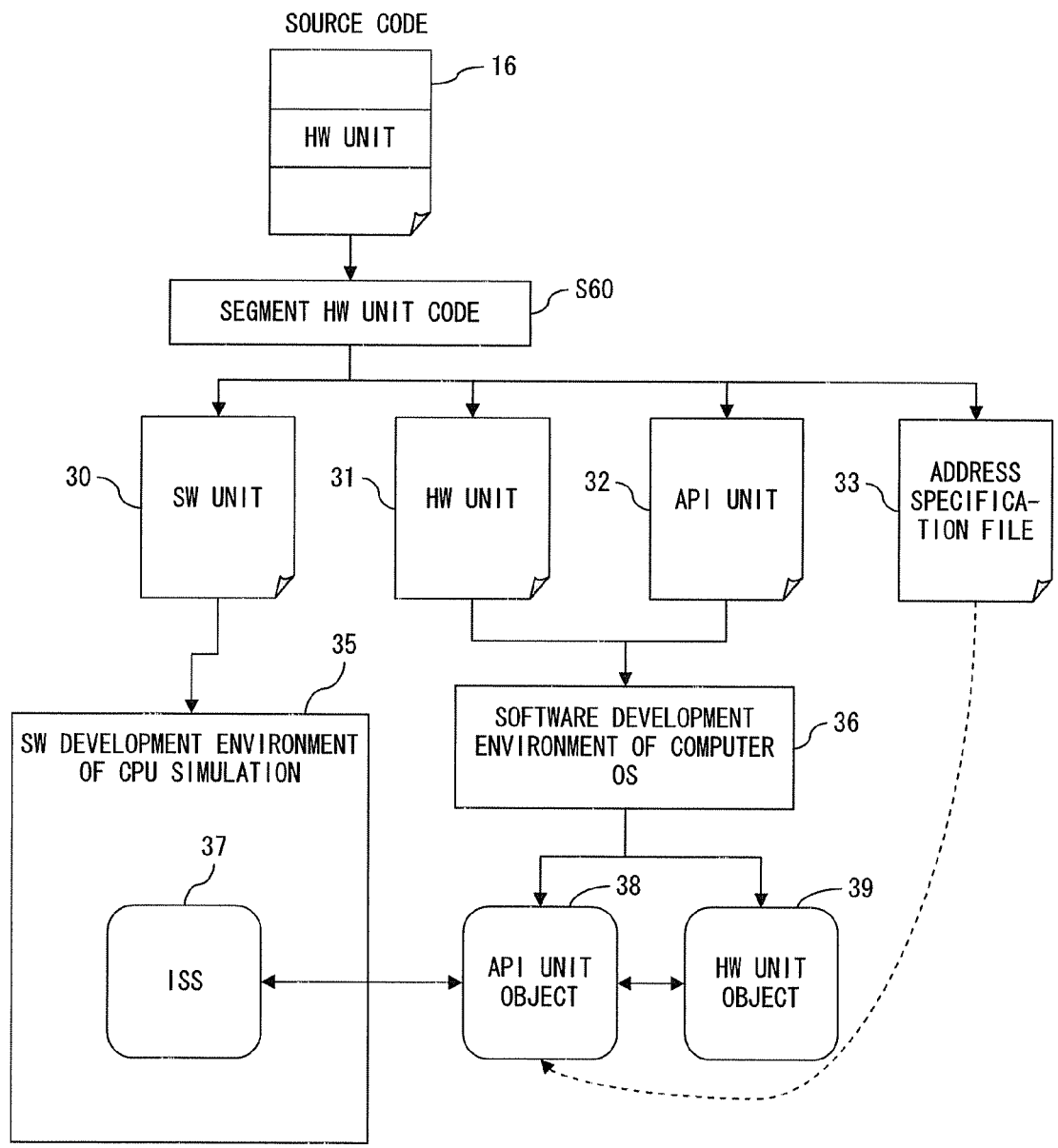
F I G. 1 3

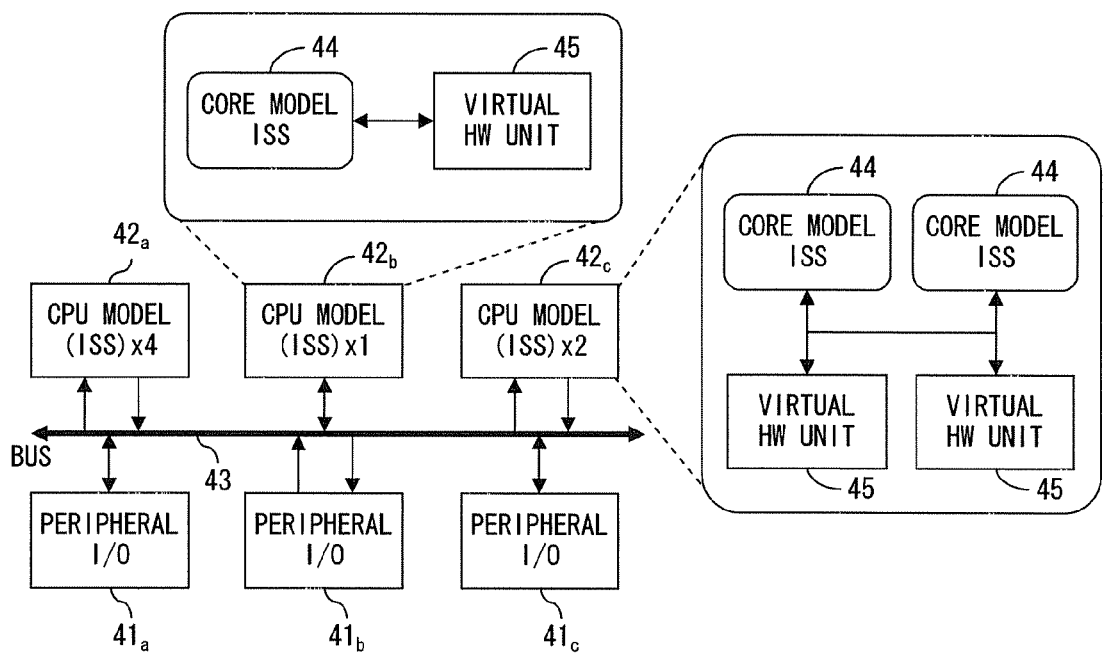
F I G. 16

SOFTWARE/HARDWARE PARTITIONING PROGRAM AND METHOD

CROSS-REFERENCE TO RELATED APPLICATIONS

This application is based upon and claiming the benefit of priority from the prior Japanese Patent Application No. 2006-109848 filed in Apr. 12, 2006, the entire contents of which are incorporated herein by reference.

BACKGROUND OF THE INVENTION

1. Field of the Invention

The present invention relates to a development system for a large scale integrated circuit for performing an application, and more specifically to a software/hardware partitioning program and method for determining the partition between software and hardware in developing a system-on-chip (SoC) for realizing the application.

2. Description of the Related Art

Recently, a system-on-chip (SoC) having a CPU and user hardware loaded on one chip has been widely used as an LSI for realizing an application, for example, the image processing in the H.264 system.

Generally, when the image processing is realized, there is the problem of outstanding arithmetic complexity for data, and it is efficient to allow hardware to process large amount of data, and the CPU to perform a controlling operation such as the management of processing time, etc. to enhance the processing speed. Thus, it is very important to improve the performance to appropriately determine the partition between hardware and software by determining which process is to be assigned to the hardware, and which process is to be the software.

That is, when one application is shared by a CPU and user hardware, the CPU performs a part of the application as a program while the user hardware has a part of software mounted as a hardware engine, thereby performing the application by the cooperation of the CPU and the user hardware. The design for partitioning an application between a CPU and hardware depends on the application and the architecture of the CPU.

Conventionally, to determine the partition between software and hardware, an operator manually partitions the source code of an application program between a portion to be processed by software and a portion to be processed by hardware, performs calculation on executable data by a visual C program using, for example, a computer, and evaluates the partition between software and hardware (SW/HW). However, there has been the problem with the method that the SW/HW partition cannot be appropriately evaluated between a built-in CPU practically loaded into the SoC and a user hardware.

The patent document 1 as a conventional technology relating to the simulation of a system description, the cooperative design between software and hardware, etc. discloses a method for simulating a description of a system specification capable of correcting measuring the runtime of candidates for software and hardware.

The patent document 2 discloses the technique of evaluating the capability of the software by determining the estimated value of the runtime of software based on a set of benchmark program and evaluating a model developed from the benchmark program.

The patent document 3 discloses a technology of integrating a simulation of hardware with a simulation of software into one application in such a way that each of them can be debugged, thereby realizing a high-speed cooperative simulation.

However, the above-mentioned conventional technology cannot solve the problem that the SW/HW partition between a built-in CPU and user hardware cannot be appropriate evaluated.

[Patent Document 1] Japanese Published Patent Application No. H11-259552 "Method For Simulating A Description Of System Specification"

[Patent Document 2] National Publication of International patent Application No. 2004-530193 "Method And Apparatus For Statistical Evaluation Of Runtime Of Built-In Software"

[Patent Document 3] Japanese Published Patent Application No. 2005-332110 "Simulation System"

SUMMARY OF THE INVENTION

The present invention has been developed to solve the above-mentioned problem, and aims at determining the partition between software and hardware such that the partition can be optimum for the application to be performed in the system corresponding to a practical built-in CPU and the hardware partitioned by a source code using, for example, a simulator exclusive for a built-in CPU loaded into a system on chip.

A feature of the present invention resides in a software/hardware partitioning evaluating program used to direct a computer to partition a source code into a software unit and a hardware unit to realize an application. The program includes:

a procedure of compiling a source code in which a mark is added to a hardware unit to be executed by hardware in the source code corresponding to the application, and generating an executable program for a simulator of a central processing unit used to realize an application;

a procedure of storing in memory an execution result of the executable program using the simulator; and a procedure of evaluating a partition between a software unit and a hardware unit corresponding to a mark added to the hardware unit based on the execution result stored in the memory.

BRIEF DESCRIPTION OF THE DRAWINGS

FIG. 1A is a block diagram of the function showing the principle of the software/hardware partitioning program according to the first embodiment of the present invention;

FIG. 1B is a block diagram of the function showing the principle of the software/hardware partitioning program according to the second embodiment of the present invention;

FIG. 4 is a flowchart of the entire process of performing a CPU model simulation;

FIG. 6 shows an example of the information obtained as a result of a simulation;

FIG. 7 shows an example (1) of inserting a hardware unit mark to a source code;

FIG. 9 is an explanatory view of the method of inserting a hardware unit mark using a graphic user interface;

FIG. 10 is a basic flowchart of the software/hardware partitioning process according to the second embodiment of the present invention;

FIG. 11 is an explanatory view of the hardware unit calling system according to the second embodiment of the present invention;

FIG. 12 is a detailed flowchart of the instruction execution function process according to the second embodiment of the present invention;

FIG. 13 is an explanatory view of the hardware unit generation system connected to an instruction set simulator;

FIG. 16 shows an example of the configuration of a model of a system on chip;

DETAILED DESCRIPTION OF THE PREFERRED EMBODIMENTS

FIGS. 1A and 1B are block diagrams of the function showing the principle of the software/hardware partitioning program according to the present invention. FIG. 1A shows the first embodiment described later, and FIG. 1B corresponds to the second embodiment. The figures are block diagrams of the function showing the principle of the program used by a computer which partitions a source code, which is used to realize an application, into a software unit and a hardware unit.

In FIG. 1A, in step S1, in the source code corresponding to the application, the procedure of compiling the code in which a mark is added to the hardware unit to be executed on the hardware side, and generating an executable program for a simulator of the central processing unit for use in realizing an application is performed. In step S2, the procedure of storing in memory an execution result of the executable program by the simulator is executed. In step S3, the procedure of evaluating the partition between the software corresponding to the mark added to the hardware unit and the hardware is performed.

In FIG. 1B, as described above, the code in which a mark is added to the hardware unit is compiled, a model of the hardware unit as a process portion to be realized by the hardware, an executable program for a simulator of the central processing unit for use in realizing an application, and an interface for calling the model of the hardware unit from the executable program side are generated in step S4. In step S5, an execution result of an executable program by a simulator is stored in the memory including the result of execution performed by calling a hardware unit model by a simulator. In step S6, the partition between the software corresponding to a mark of the hardware unit and the hardware is evaluated using the stored contents of the memory.

As described above, according to the present invention, the source code in which a mark is added to the hardware unit is compiled, and a generated executable program is executed by, for example, a simulator of the central processing unit used for realizing an application, and the partition between the software and the hardware is evaluated corresponding to the execution result.

According to the present invention, a partition between software and hardware can be appropriately evaluated by an execution result of the program by a simulator of the central processing unit used in realizing an application, and the evaluation of a partitioning plan between software and hardware can be easily performed at the initial designing stage of the SoC.

Figure 2:
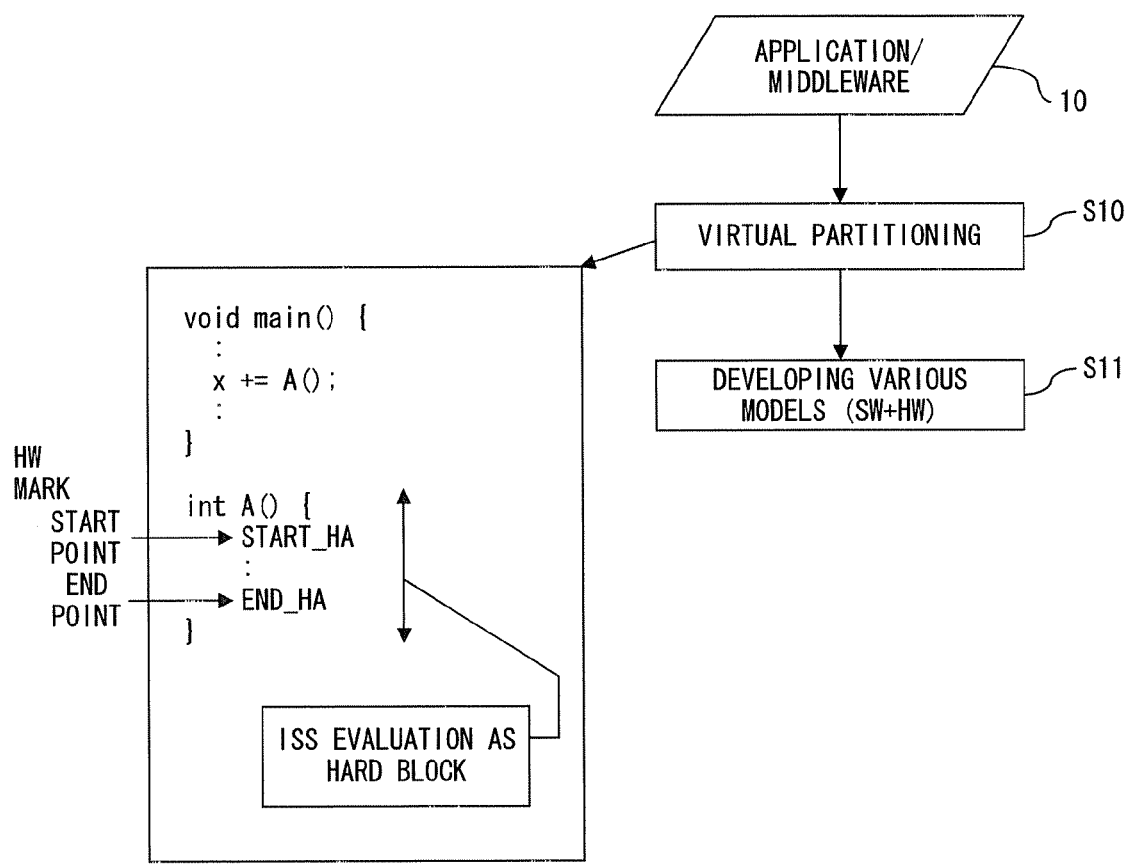
FIG. 2 is a flowchart of the entire process of the virtual partitioning system according to the present invention.

FIG. 2 is a flowchart of a software/hardware (SW/HW) partition, that is, the entire process of the virtual partitioning system according to the present invention. In FIG. 2, with a view to developing an LSI specialized for an application, an SW/HW partition, that is, virtual partitioning, is performed in step S10 on an application to be implemented, or middleware 10, and various models (SW+HW) are developed in step S11.

In the virtual partitioning process in step S10, the mark indicating the start point and the end point of the HW unit (hard block) which is considered efficient when it is executed by hardware in the source code of an application is embedded. That is, the coding process is performed such that the mark indicating the start point and the end point of the HW unit can be identified on the tool as a software development environment for the development of a built-in software.

When an application, for example, an LSI specialized for H.264 is developed, it is necessary to have an application to be implemented, that is, software operated by a simulator of a built-in CPU. In the built-in software development environment with the above-mentioned purpose, for example, an instruction set simulator (ISS) is incorporated as a CPU simulator to be developed, or another simulator executable by a CPU architecture is incorporated instead of an ISS. In the present invention, the following configuration including an ISS is explained. An ISS is a simulator capable of executing a program at an instruction level.

In the virtual partitioning in step S10, the SW/HW partition is virtually performed, and the partition is evaluated based on the simulation result using, for example, the ISS. When the evaluation result is not satisfactory, control is returned to the virtual SW/HW partition again, and a different partition is evaluated again. When an evaluation result is accepted, the SW/HW partition terminates, and various models are developed in step S11. Various models can be a C/C++ model of ISS+HW, a SystemC model of ISS+HW, an RTL model, etc. Since the model itself is not directly related to the present invention, the detailed explanation is omitted here.

Figure 3:
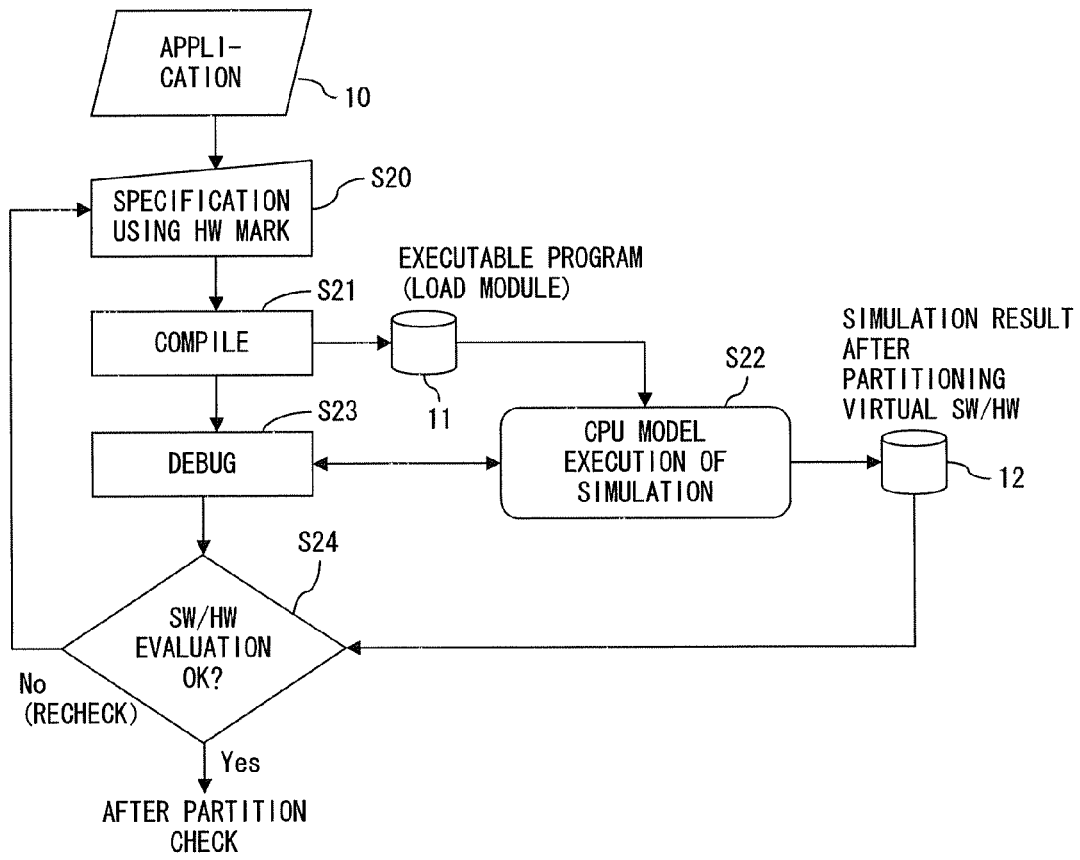
FIG. 3 is a basic flowchart of the software/hardware partitioning process according to the first embodiment of the present invention.

FIG. 3 is a flowchart of the basic process of virtual partitioning in step S10 shown in FIG. 2 according to the first embodiment of the present invention. In FIG. 3, the mark of the HW is directly inserted in to the source code of the application 10 in step S20, and the HW unit to be partitioned from the SW unit is specified. The portion specified as the HW unit is enclosed by the marks indicating the start and end points of the HW unit as explained by referring to FIG. 2. The source codes other than the HW mark are executed on the CPU, and the source code into which the HW mark is inserted is provided for the compile process in step S21.

In step S21, for example, the executable program on the ISS, that is, a load module 11, is generated, and a simulation executing process is performed on a CPU model in step S22 using the load module 11. In the simulation, the HW unit in which the HW mark is embedded as shown in FIG. 2 is identified from other SW units, but is processed as in the normal process on the ISS like the SW unit. The simulation execution result is associated with the SW unit and the HW unit, and separately stored in memory 12.

On the other hand, in step S23, a result of the simulation is referenced even during the simulation executing process in step S22, and a debugging process is performed on the load module 11 as necessary.

In step S24, the simulation result corresponding to the virtual partitioning of the SW/HW stored in the memory 12 is evaluated. If the evaluation result is accepted, the partition between software and hardware terminates. If the evaluation is not accepted, control is returned to step S20, a different software/hardware partitioning process is performed, and the processes in and after step S21 is repeated.

In the first embodiment, the executing process is performed on the HW unit as with the SW unit by the ISS as described above. However, since the ISS is an LSI specialized for a certain application, that is, a simulator of the CPU incorporated into a system on chip (SoC), a more appropriate evaluation can be made on the SW/HW partition on the practical SoC as compared with the case where the SW/HW partition is evaluated using a common personal computer independent of a built-in CPU as in the conventional technology. The ISS has the function of executing a user C function as a Hard function, and the virtual partitioning of the SW/HW can be evaluated using only the ISS.

FIG. 4 is a flowchart showing the entire process of the simulation in step S22 shown in FIG. 3. In FIG. 4, if an executable program 11 is given, and the entire main process is started in step S26, it is determined in step S27 whether or not there is an instruction to be executed. If there is the instruction, an executing process of an Exe_loop function as a processor element (PE) 0 model is performed in step S28, and the loop of steps S27 and S28 is repeated until there is no instruction to be executed in step S27. When it is determined that there is no instruction to be executed, the process terminates. In this example, only the execution of the process on an processor element 0 is described, but it is obvious that the process can be a process executed by multiple cores.

Figure 5:
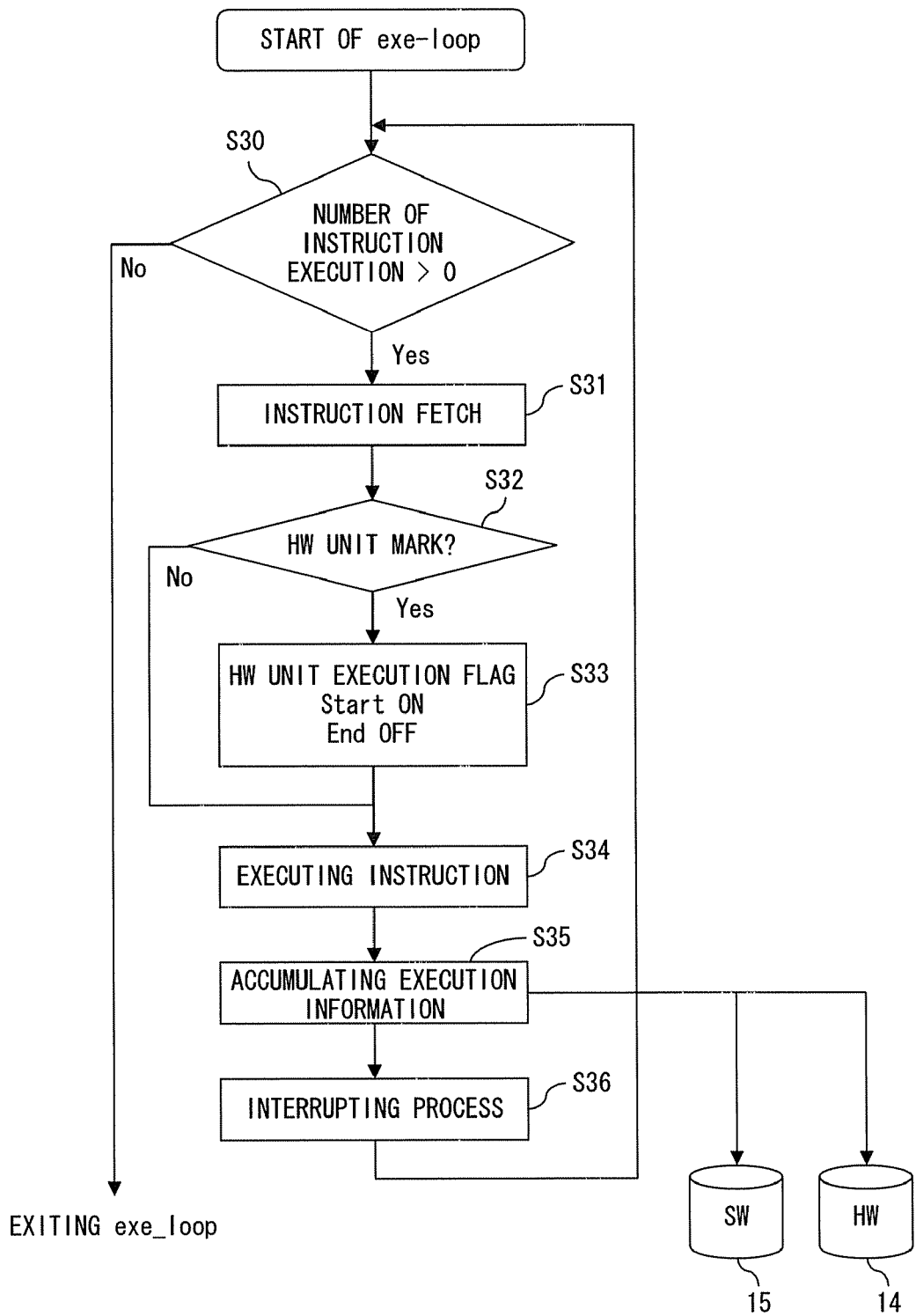
FIG. 5 is a detailed flowchart of the instruction execution function process shown in FIG. 4.

FIG. 5 is a detailed flowchart of the executing process on the processor element 0 in step S28. The following explanation is given by assuming that the number of execution steps is passed to the Exe-loop function as an execution engine of the ISS, and the function is called.

When the process is started in FIG. 5, it is determined in step S30 whether or not there is an instruction to be executed. If there is the instruction, the instruction is fetched and decoded in step S31. In step S32, it is determined whether or not the instruction is an HW unit mark as a special instruction. If it is the mark, then, in step S33, an HW unit execution flag is placed in the ON position for the HW unit start mark, and then the instruction executing process is performed in step S34. If it is not the HW mark, the instruction executing process is immediately performed in step S34. If the HW unit mark indicates the endpoint of the HW unit in step S33, the HW unit execution flag is placed in the OFF place.

In step S34, the type of the information to be executed is grasped, the number of cycles is determined by an instruction, and the execution information as a result of the execution of the instruction is accumulated in step S35. The execution information is stored in memory 14 as the instruction execution information of the HW unit if the HW unit flag is in the ON position. If the HW unit flag is in the OFF position, the information is stored in memory 15 as the execution information about the SW unit.

Then, interrupt processing is performed in step S36, control is returned to step S30, and the processes in and after step S31 are repeated if there are instructions to be executed. If there is no instruction to be executed, control exits the Exe-loop as an execution function, and is returned to the process in step S27 shown in FIG. 4. The interrupt processing in step S36 is a common process on, for example, timer interrupt, etc., has nothing directly to do with the present invention, and the process in step S36 is not performed if it is not necessary.

FIG. 6 shows an example of execution information accumulated in step S35 shown in FIG. 5. As execution information, the information about the type of execution information, the number of instructions including the arithmetic complexity, for example, the number of cycles on the whole, for example, the amount of data access by load/store in the memory, the type of access, etc. can be obtained.

In the multiprocessor system, the communication frequency and the amount of communication data for the control and information transmission among processors, the parallelism of programs among processors, that is, the confirmation information dependent on data, etc. can be obtained, and the information is stored in the memory 14 and 15 shown in FIG. 5 separately for the result of the HW unit and the result of the SW unit.

Figure 8:
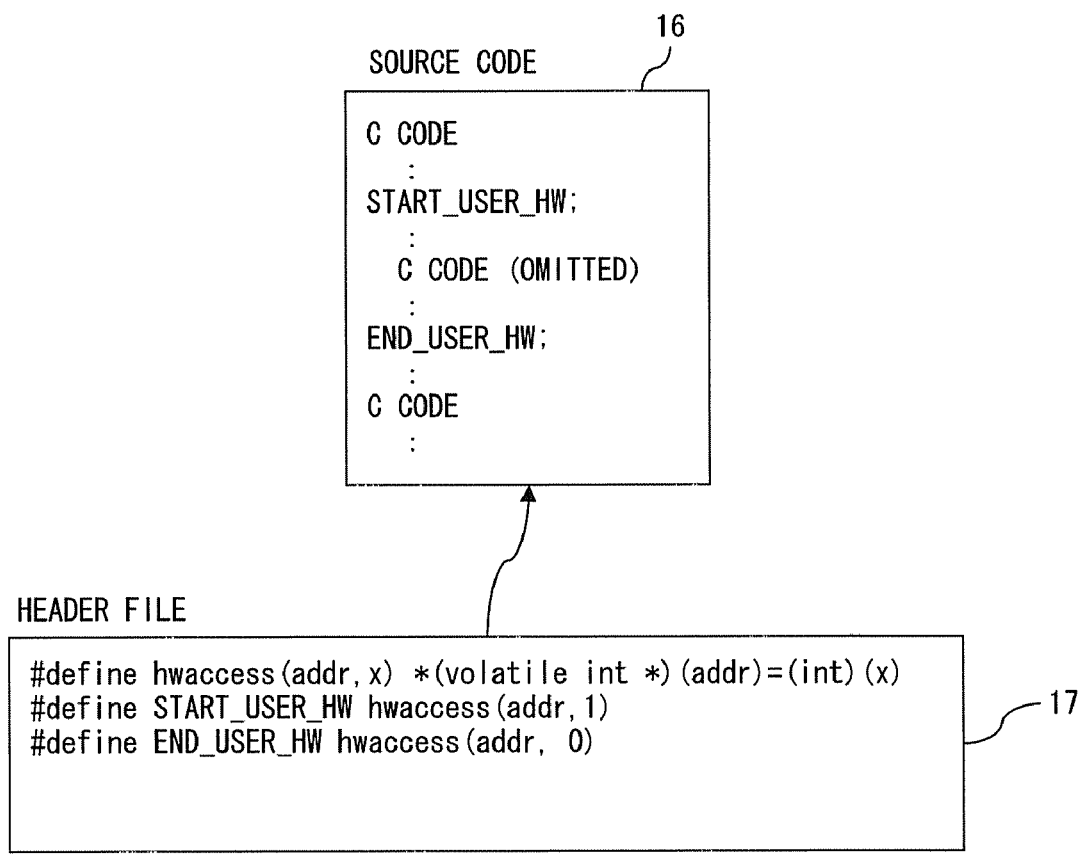
FIG. 8 shows an example (2) of inserting a hardware unit mark to a source code.

Then, the insertion of the HW unit mark into a source code is further explained using FIGS. 7 through 9. In FIG. 7, the pragma unit as a special instruction is inserted into a source code 16, thereby indicating the start point and the end point of the HW unit. That is, "#pragma" inserts the special instruction indicating the start point of the HW unit, and "#end" inserts the special instruction indicating the end point of the HW unit into the C/C++ source code, and the start and end of the HW unit are recognized by, for example, the ISS.

FIG. 8 shows an example of a different HW unit mark inserted into, for example, the C source code 16. In this example, START_USER_HW is inserted as a special instruction indicating the start point of the HW unit, and END_USER_HW is inserted as a special instruction indicating the end point of the HW unit. The definition of these special instructions is recognized by the ISS as hardware access by referring to, for example, a header file 17, the start of the HW unit is indicated by the variable "addr, 1", and the end is indicated by "addr, 0".

The special instruction inserted into a source code is originally an instruction completely independent of a source code of an application, but an instruction recognized only by, for example, an ISS as a CPU simulator. The instruction code in the HW unit enclosed by the start point and the end point can include the data that can identify the HW block as a part of the HW unit, for example, an address.

FIG. 9 is an explanatory view of an example of embedding an HW mark using a GUI (graphic user interface). In FIG. 9, the user can specify the start point and the end point, and the portion between the start point and the end point is specified as a virtual HW unit.

The explanation of the first embodiment is finished, and the second embodiment is described below. In the first embodiment, the SW/HW partition is performed by inserting an HW unit mark into a source code, but actual instruction execution is performed by, for example, an ISS on the SW unit and the HW unit, and the execution information as an execution result of a simulation is accumulated separately as the execution information for the SW unit and the execution information for the HW unit. On the other hand, in the second embodiment, a model different from the CPU model exists for the HW unit as, for example, the HW unit of the C model. When a mark of a start point of he HW unit is recognized on the source code, control is passed to the HW unit through the application program interface (API), and when the mark indicating the end point of the HW unit is recognized, control is returned to the ISS as a CPU model again, thereby performing a simulation.

FIG. 10 is a basic flowchart of the virtual partitioning process according to the second embodiment. When FIG. 10 is compared with FIG. 3 corresponding to the first embodiment, an HW mark is directly inserted into the middleware 10 in step S40 as in FIG. 3, the HW unit is specified, and a compiling process is performed in step S41. The contents of the compiling process are different from those shown in FIG. 3.

That is, in the compiling process, an HW unit 22 is separated as an independent object corresponding to a result of the SW/HW partition. For example, a load module 21 as an executable program provided for the ISS can be only the SW unit, but as described later, to allow the ISS to execute an instruction of the HW unit, assume that both SW unit and HW unit can be included.

In step S42, a simulation is performed using a CPU model, for example, an ISS, and a result is stored in the memory 12 as in FIG. 3. However, when the start point of the HW unit is recognized, the HW unit 22 is called by the addressing by an API (application programming interface) 23, and the HW unit is processed. The debugging process in step S43 and the partition evaluation determining process in step S44 are the same as those shown in FIG. 3.

FIG. 11 is an explanatory view of the HW unit calling system from the Exe-loop of the second embodiment, that is, an instruction execution function. In FIG. 11, the API (API) 23 is located between an Exe-loop 24 and an HW block 25, and the HWblock 25 is constituted by a plurality of HWblocks $25_1$ through $25_N$ corresponding to, for example, an HW function. Which block is to be called is determined depending on the contents of an address specification file 26. The address specification file 26 shows the correspondence between an HW block, that is, an HW function and its address, and an HW function of a corresponding address is called depending on which HW function is to be called. The process of an HW unit is to be closed inside the called HW function, and a return value is returned to the CPU model side through the API 23.

FIG. 12 is a detailed flowchart of the instruction execution function shown in FIG. 11, that is, the Exe-loop process. In FIG. 12, as compared with FIG. 5 in the first embodiment of the present invention, in steps S50 and S51, when there is an instruction to be executed as in steps S30 and S31 shown in FIG. 5, the instruction is fetched, the instruction is decoded, and it is determined in step S52 whether or not an HW unit mark has been detected.

When it is detected, for example, the HW block 25 is called as a C model using the API 23 in the second embodiment, the HW function is executed, and a result is returned to the ISS side through the API 23.

After the process on the ISS side is restarted, and the HW unit execution flag is placed in the ON position for the start point of the HW unit mark, and in the OFF position for the end point in step S53, it is determined in step S54 whether or not an instruction is to be executed. The determination is made as to whether or not the instruction with which the HW function is executed by the HW block 25 is also to be executed on the ISS side. The determination is performed such that the determination result can be the same on one HW unit enclosed by the start point and the end point as marks.

Then, an instruction is performed in step S55. In this example, an instruction not recognized as an HW unit mark in step S52, that is, the instruction of the SW unit is obviously executed, and when an instruction of the HW unit is executed in step S54, the instruction is also executed. When the instruction of the HW unit is not executed on the ISS side, the instruction execution in step S55 is not executed, and control is passed to step S56.

In step S56, as in the first embodiment, the information about a result of the instruction execution on the HW unit is stored in the memory 14, and the execution information on the SW unit is stored in the memory 15. The execution information obtained when the instruction execution is executed by the ISS is also accumulated in the memory 14. The interrupt processing in step S57, etc. is the same as what is shown in FIG. 5 showing the first embodiment, and the explanation is omitted here.

FIG. 13 is an explanatory view of the HW unit generation system connected to the ISS in the second embodiment. In FIG. 13, the HW unit delimited by the mark in the source code 16 is segmented in the HW unit code segmenting process in step S60, an SW unit 30 and an HW unit 31 is partitioned, an API unit 32 and an address specification file 33 are newly generated, and the HW unit 31 and the API unit 32 are provided for a software development environment 36 for the computer OS, and the SW unit 30 is provided for an SW development environment 35 of the CPU simulation. The contents of the address specification file can be automatically set during the compilation in step S41 shown in FIG. 10, or can be specified by, for example, a user when a mark is added to a hardware unit.

The SW development environment 35 of the CPU simulation is provided with the ISS 37, and an API unit (object) 38 and an HW unit 39 corresponding to the software development environment 36 for the computer OS are generated. An ISS 37 is connected through the HW unit 39 and the API unit 38. The connection is controlled by the contents of the address specification file 33. The addressing can be performed also by another file such as the address specification file 33, etc. as shown here, and also can be performed by embedding the contents of the file in the API unit 38. Thus, according to the second embodiment, the process of the HW unit can be performed as an object function of the same level as the ISS instead of performing the process of the HW unit by the ISS, thereby performing the process at a higher speed than the first embodiment.

Figure 14:
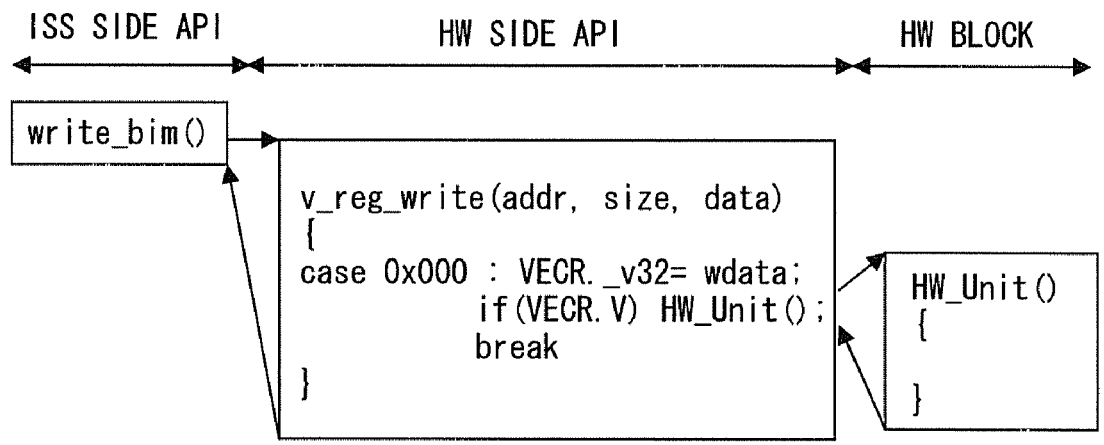
FIG. 14 is an explanatory view of an example of access from an instruction set simulator to a hardware unit through an application programming interface.

FIG. 14 is an explanatory view of data write access from the ISS side to an HW unit, for example, memory, as an example of connecting the ISS to the HW unit. The API on the ISS side is write_bim ( ), and the API object on the HW side accesses the HW block (unit) as an object of the HW unit through v_reg_write ( ).

Figure 15:
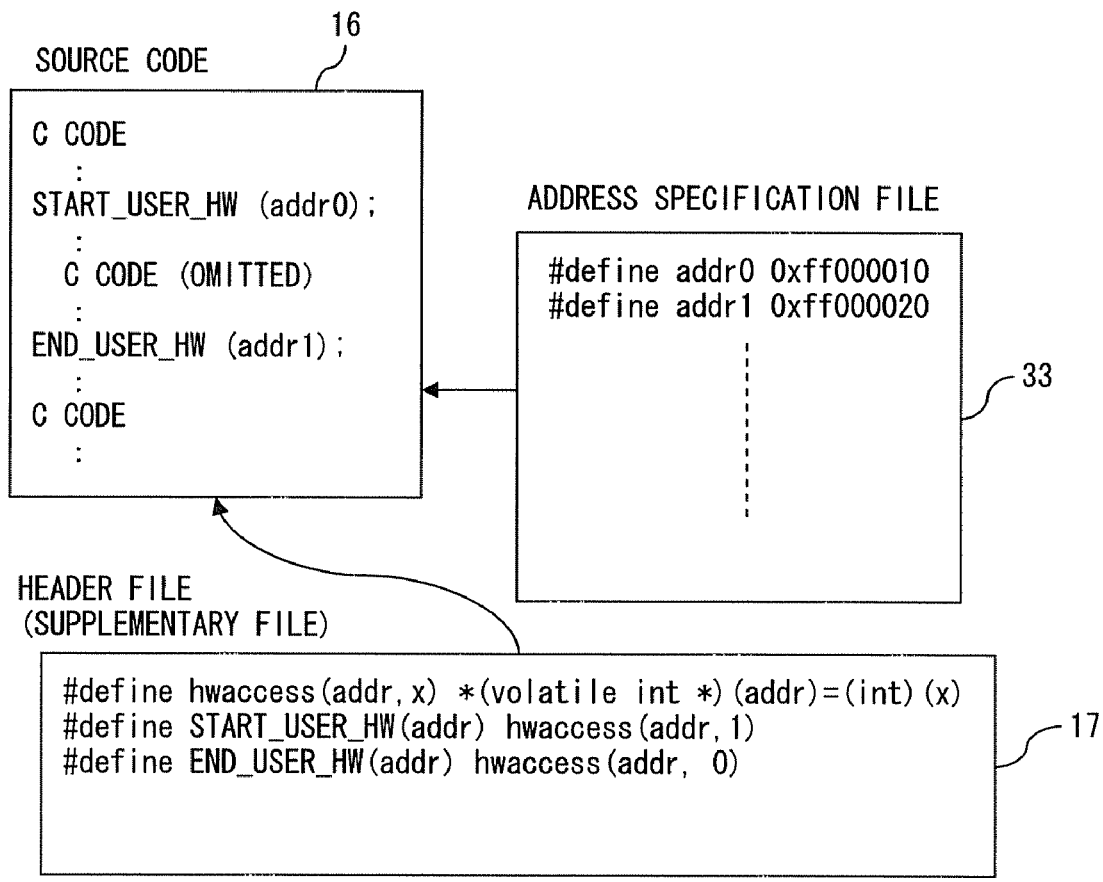
FIG. 15 shows an example of an address specification file according to the second embodiment of the present invention.

FIG. 15 is an explanatory view of an example of the address specification file according to the second embodiment. Since the START_USER_HW as a start mark of the HW unit embedded in the source code 16 is a special instruction, the ISS refers to the header file 17, and recognizes that the instruction defines hardware access. Depending on the contents of the address specification file 33, it recognizes that "addr0" is "0xff000010", and can call a function as an HW unit block using the address.

According to the second embodiment, various information shown in FIG. 6 as a result of the simulation after the virtual SW/HW partition is obtained. The insertion of the HW unit mark into a source code and specification using a GUI are the same as those shown in FIGS. 7 through 9 according to the first embodiment, and explanation is omitted here.

Figure 17:
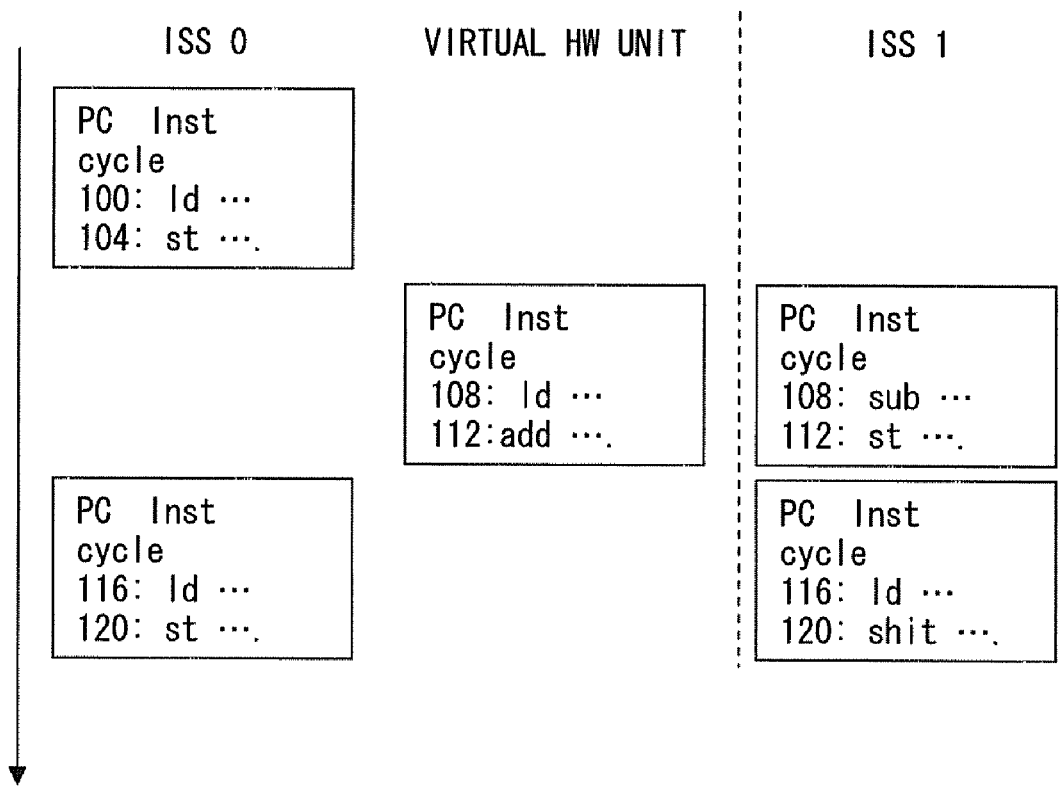
FIG. 17 is an explanatory view of holding data in the system shown in FIG. 16.

The SoC (system on chip) model including a CPU model constituted by the ISS and the virtual HW unit as a core model is explained by referring to FIGS. 16 and 17. The system model can be constituted without discriminating the first embodiment from the second embodiment.

In FIG. 16, the system model as a SoC model is constituted such that a plurality of peripheral I/O (input/output units) $41_a$ through $41_c$ and a plurality of CPU models 42a through 42c are connected to a bus 43. One or more ISS's are provided in each CPU model. For example, the CPU model $42_b$ is constituted by one core model, that is, an ISS 44 and a virtual HW unit 45. The CPU model $42_c$ is constituted by two core models, that is, the ISS 44 and two virtual HW units 45.

In FIG. 16, the result of the virtual SW/HW partitioning can be evaluated by a simulation of a partition using a multiple CPU model with the same-type or different-type configuration. In the simulation of a partition, for example, the process of the flowchart shown in FIG. 5 is performed in parallel. Therefore, the parallelism of a program can be extracted. Furthermore, for example, in the SystemC or the C/C++ SoC model, the SW/HW partition can be redesigned of the partition between software and hardware can be optimized in the CPU core (ISS).

FIG. 17 is an explanatory view of holding data in the system shown in FIG. 16. Assuming that the two ISS's 44 in the CPU model $42_c$ shown in FIG. 16 are respectively ISS 0 and ISS 1, the virtual HW unit is detected by an HW unit mark on the ISS 0 side, and the processes corresponding to the SW unit and the HW unit are performed as executed above by referring to the first and second embodiments, and the process of only the SW unit is performed on another ISS 1 side. However, various types of data formats can be used, and are not limited.

Figure 18:
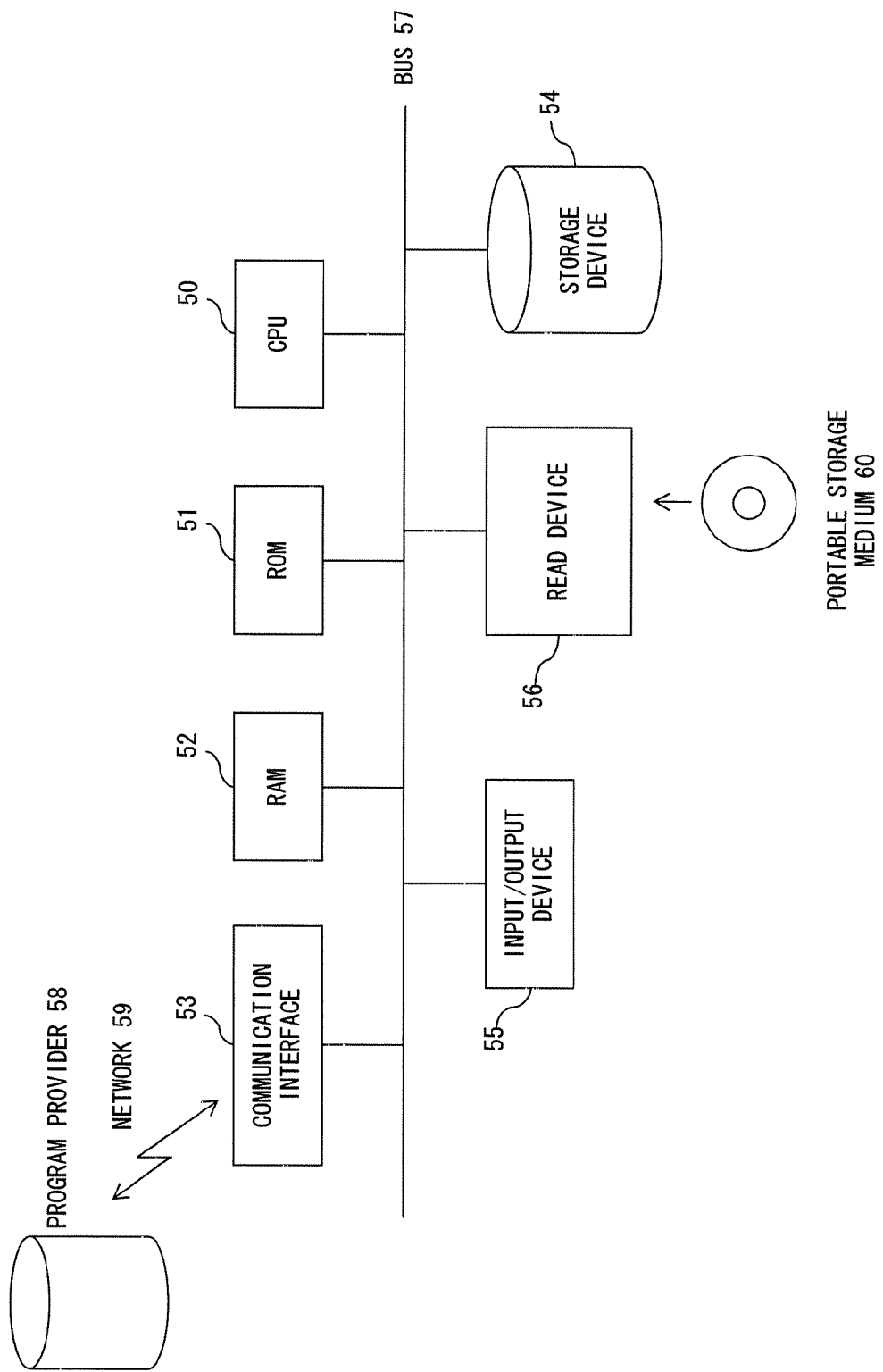
FIG. 18 is an explanatory view of loading a program to a computer according to the present invention.

In the description above, the SW/HW partition evaluating program and partition evaluating method are explained, but the designing system which uses the program as a tool can be constituted using a common computer system as a base. FIG. 18 is a block diagram of the configuration of the computer system, that is, a hardware environment.

In FIG. 18, the computer system comprises a central processing unit (CPU) 50, read only memory (ROM) 51, random access memory (RAM) 52, a communication interface 53, a storage device 54, an input/output device 55, a portable storage medium read device 56, and a bus 57 connecting all these components.

The storage device 54 can be used any type of storage device such as a hard disk, a magnetic disk, etc. The storage device 54 or ROM 51 stores a program shown in the flowchart in FIGS. 3 through 5, FIG. 10, and FIG. 12, a program according to claims 1 through 12 of the present invention. The program is executed by the CPU 50, thereby evaluating the SW/HW partition and developing various models corresponding to an appropriate partition result, etc.

The program can be stored by, for example, the storage device 54 from a program provider 58 through a network 59 and the communication interface 53, or marketed and stored in a distributed portable storage medium 60, set in the read device 56, and executed by the CPU 50. The portable storage medium 60 can be used any of various types of storage medium such as CD-ROM, a flexible disk, an optical disk, a magneto optical disk, a DVD, etc. The program stored in the storage medium is read by the read device 56, thereby evaluating the SW/HW partition according to the mode for embodying the present invention.

What is claimed is:

1. A computer-readable storage medium that stores a software/hardware partitioning evaluating program used to direct a computer to partition a source code into a software unit and a hardware unit to realize an application for a system-on chip (SoC), wherein the evaluating program enables the computer to execute:

compiling a source code corresponding to the application, in which a mark is added to the source code to indicate a start point and an endpoint of a hardware unit, the hardware unit representing source code to be executed by hardware, and generating a model of the hardware unit as a process portion to be realized by hardware, and an executable program for a simulator of a central processing unit used to realize the application processing, using the simulator, the executable program using an execution process that executes the hardware unit through an object function call to the model of the hardware unit and an execution process that executes a software unit without the object function call, the software unit representing the source code excluding the hardware unit;

storing in memory an execution result of the executable program using the simulator including a result obtained by execution performed by calling a model of the hardware unit; and evaluating, based on the execution result stored in the memory, a partition between the software unit and the hardware unit corresponding to the mark added to the hardware unit, wherein the execution result includes at least a processing time of the hardware unit and at least a processing time of the software unit.

2. The computer-readable storage medium according to claim 1, wherein
the simulator performs all processes corresponding to the source code of the application including a process corresponding to the model of the hardware unit in addition to a process corresponding to the software unit.

3. The computer-readable storage medium according to claim 1, wherein the computer further performs a procedure of generating an address specification file storing an address of the object function during the compilation.

4. The computer-readable storage medium according to claim 3, wherein
the address stored in the address specification file is automatically set during the compilation.

5. The computer-readable storage medium according to claim 3, wherein
the address stored in the address specification file is set corresponding to a user specification when the mark is added to the hardware unit.

6. A software/hardware partitioning evaluating method for partitioning a source code into a software unit and a hardware unit to realize an application for a system-on chip (SoC), the method comprising:

compiling a source code corresponding to the application, in which a mark is added to the source code to indicate a start point and an endpoint of a hardware unit, the hardware unit representing source code to be executed by hardware, and generating a model of a hardware unit as a process portion to be realized by hardware, and an executable program for a simulator of a central processing unit used to realize the application processing, using the simulator, the executable program using an execution process that executes the hardware unit through an object function call to the model of the hardware unit and an execution process that executes a software unit without the object function call, the software unit representing the source code excluding the hardware unit;

storing in memory an execution result of the executable program using the simulator; and evaluating, based on the execution result stored in the memory, a partition between the software unit and the hardware unit corresponding to the mark added to the hardware unit, wherein the execution result includes at least a processing time of the hardware unit and at least a processing time of the software unit.

* * * * *